United States Patent
Krojzl et al.

(10) Patent No.: US 10,769,174 B2
(45) Date of Patent: Sep. 8, 2020

(54) SITE-CONSOLIDATED DISASTER-RECOVERY WITH SYNCHRONOUS-TO-ASYNCHRONOUS TRAFFIC CONVERSION

(71) Applicant: International Business Machines Corporation, Armonk, NY (US)

(72) Inventors: Tomas Krojzl, Brno (CZ); Erik Rueger, Ockenheim (DE)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 15/993,813

(22) Filed: May 31, 2018

(65) Prior Publication Data
US 2019/0370380 A1    Dec. 5, 2019

(51) Int. Cl.
G06F 15/16    (2006.01)
G06F 16/27    (2019.01)
G06F 11/14    (2006.01)

(52) U.S. Cl.
CPC ........ *G06F 16/275* (2019.01); *G06F 11/1464* (2013.01); *G06F 11/1469* (2013.01); *G06F 11/1471* (2013.01); *G06F 2201/80* (2013.01)

(58) Field of Classification Search
None
See application file for complete search history.

(56) References Cited

U.S. PATENT DOCUMENTS

| 7,149,919 | B2 | 12/2006 | Cochran et al. |
| 7,325,019 | B2 | 1/2008 | Lam |
| 7,395,352 | B1 | 7/2008 | Lam |
| 8,132,043 | B2 | 3/2012 | Dash |
| 8,572,431 | B2 | 10/2013 | Adler et al. |
| 8,977,886 | B2 | 3/2015 | Bauer et al. |

(Continued)

OTHER PUBLICATIONS

Alibaba Cloud, Disaster Recovery Across Multiple Data Centers, Retrieved from Internet: URL:http://alicloud-common.oss-ap-southeast-1.aliyuncs.com/Alibaba%20Cloud%20Solution%20Infrastructure%20-%20Disaster%20Recovery.pdf, 1 page.

(Continued)

*Primary Examiner* — Alex Gofman
(74) *Attorney, Agent, or Firm* — Schmeiser, Olsen & Watts; Mark C. Vallone

(57) ABSTRACT

A disaster-recovery system contains a networked array of synchronous-to-asynchronous converter (SATC) modules that connect source databases to target backup databases. During backup, the system replicates each source-database transaction through a chain of these SATCs to a corresponding target, storing a local copy of the transaction on each SATC along the way. Each transaction's path between its source-target pair is identified by a set of tracking entries, where each entry identifies one SATC in the path. Before initiating a recovery operation, the system regenerates the tracking entries in order to reconstruct paths to source databases. The system then synchronously searches SATCs along each path for local copies of lost transactions that had not time to be fully replicated before the occurrence of a catastrophic failure. The full-blown recovery is started only after all lost transactions have been properly replicated to target databases.

20 Claims, 10 Drawing Sheets

(56) References Cited

U.S. PATENT DOCUMENTS

| | | |
|---|---|---|
| 2013/0124916 A1 | 5/2013 | Shutt et al. |
| 2013/0227334 A1 | 8/2013 | Wang |
| 2014/0040206 A1 | 2/2014 | Ramakrishnan et al. |
| 2015/0261768 A1 | 9/2015 | Ahn |
| 2017/0123925 A1* | 5/2017 | Patnaik ................. G06F 11/143 |
| 2017/0161308 A1* | 6/2017 | Jarvis ................. G06F 16/2237 |
| 2019/0370379 A1 | 12/2019 | Krojzl |

OTHER PUBLICATIONS

Bhattacharya et al., Distributed Data Recovery Architecture Based on Schema Segregation, Date of Conference: Mar. 22-25, 2017, Retrieved from Internet: URL:http://ieeexplore.ieee.org/abstract/document/7915540/, 3 pages.

U.S. Appl. No. 15/993,744, filed May 31, 2018.

Labriola, Donald J.; List of IBM Patents or Patent Applications Treated as Related; Apr. 9, 2020; 1 page.

Manaktala, Rohit Sudhish; Optimization of Disaster Recovery Leveraging Enterprise Architecture Ontology; Thesis Presented in Partial Fulfillment of the Requirements for the Degree Master of Science in the Graduate School of the Ohio State University; 2013; 70 pages.

* cited by examiner

SITE-CONSOLIDATED DISASTER-RECOVERY WITH SYNCHRONOUS-TO-ASYNCHRONOUS TRAFFIC CONVERSION

BACKGROUND

The present invention relates to computer-data backup and recovery technology and in particular to improvements to disaster-recovery (DR) systems that allow such systems to more efficiently back up and recover data after a catastrophic data-loss event.

Disaster-recovery systems are today configured to back up and restore data on a component, or server-to-server, basis. This is true even when an entire data center is configured to be protected by a single disaster-recovery system. Database transactions and other types of information are captured from each information source, such as a source database that logs database transactions into a local area of persistent storage, and replicated to a target recovery database that is usually located at a physically distinct site. Similarly, when recovering from a catastrophic loss, previously backed-up data is replicated from each target database to a recovery database that will allow users to access data copied from the source.

Known DR systems may in practice require an enormous number of component-to-component connections, each of which captures or restores data associated with a single information source. In modern datacenters that comprise thousands of databases and other types of information repositories, the complexity of such component-to-component DR systems makes them resource-intensive, difficult to configure, and burdensome to manage.

In particular, because each source component may require independent, customized backup and recovery procedures, a network or system administrator has little control over a DR system's aggregate, datacenter-level resource utilization and task prioritization. For example, if a recovery operation requires 500 components to be restored, known DR systems must manage each restoration task independently, making it difficult to prioritize or efficiently manage the consumption of network bandwidth and other resources required to recover lost data of an entire datacenter.

In one example, a datacenter may comprise one thousand database servers that are continuously backed up to target recovery servers scattered across three other sites. After a catastrophic failure that has affected a subset of the database servers and a subset of the network connections between source-server/target-server pairs, recovery operations may be hampered by the need to determine, one-by-one, which source databases require access to recovery servers still at remote sites, which recovery servers are still operational, and which recovery servers have the connectivity required for recovery. These problems are further aggravated by the lack of a way to manage all recovery operations and all communications between source and recovery server pairs through a dedicated connection.

Another problem with known DR systems is loss of database transactions and other stored information that had been created or revised immediately before a catastrophic loss. Because a finite transfer time is required to replicate a source transaction to a remote backup, transactions-in-transit that did not have time to reach a target database may be inaccessible during a recovery operation.

These technical flaws are rooted in the architecture of current disaster-recovery technology, which is inherently limited by topology to independently backing up and restoring each data source individually through a distinct communications line; and has no way to restore data that was could not be stored successfully in a backup database from which lost data can be recovered.

SUMMARY

An embodiment of the present invention is a disaster-recovery system comprising a processor, a memory coupled to the processor, and a computer-readable hardware persistent-storage device coupled to the processor, the persistent-storage device containing program code configured to be run by the processor via the memory to implement a method for site-consolidated disaster-recovery with synchronous-to-asynchronous traffic conversion, the method comprising:

the processor receiving notice that a source database has become inaccessible, where transactions of the source database are backed up, via synchronous replication to a target database, through a backup path comprised by a disaster-recovery network, where each non-database node of the disaster-recovery network hosts a unique SATC (Synchronous-to-Asynchronous Converter) of a plurality of SATC modules, and where a synchronous replication of a transaction from a predecessor SATC on the backup path to an adjacent successor SATC on the backup path comprises storing local copies of the transaction in local persistent storage areas of the predecessor SATC and the successor SATC;

the processor identifying a range of partially replicated transactions of the source database that have not been replicated to the target database;

the processor pausing any ongoing data-restoration operations;

the processor generating one or more sets of tracking entries, where each set of the one or more sets associates one transaction of the partially replicated transactions with a recovery path, through the disaster-recovery network, from the target database to the source database;

the processor locating previously stored copies of one or more of the partially replicated transactions in local storage areas of SATCs on the recovery path;

the processor waiting until the located transaction copies have been replicated to the target database; and the processor restarting any paused data-restoration operations.

Another embodiment of the present invention is a method for site-consolidated disaster-recovery with synchronous-to-asynchronous traffic conversion, the method comprising:

a processor of a disaster-recovery system receiving notice that a source database has become inaccessible, where transactions of the source database are backed up, via synchronous replication to a target database, through a backup path comprised by a disaster-recovery network, where each non-database node of the disaster-recovery network hosts a unique SATC (Synchronous-to-Asynchronous Converter) of a plurality of SATC modules, and where a synchronous replication of a transaction from a predecessor SATC on the backup path to an adjacent successor SATC on the backup path comprises storing local copies of the transaction in local persistent storage areas of the predecessor SATC and the successor SATC;

the processor identifying a range of partially replicated transactions of the source database that have not been replicated to the target database;

the processor pausing any ongoing data-restoration operations;

the processor generating one or more sets of tracking entries, where each set of the one or more sets associates one transaction of the partially replicated transactions with a recovery path, through the disaster-recovery network, from the target database to the source database;

the processor locating previously stored copies of one or more of the partially replicated transactions in local storage areas of SATCs on the recovery path;

the processor waiting until the located transaction copies have been replicated to the target database; and the processor restarting any paused data-restoration operations.

Yet another embodiment of the present invention is a computer program product, comprising a computer-readable hardware storage device having a computer-readable program code stored therein, the program code configured to be executed by a disaster-recovery comprising a processor, a memory coupled to the processor, and a computer-readable hardware storage device coupled to the processor, the storage device containing program code configured to be run by the processor via the memory to implement a method for site-consolidated disaster-recovery with synchronous-to-asynchronous traffic conversion, the method comprising:

the processor receiving notice that a source database has become inaccessible, where transactions of the source database are backed up, via synchronous replication to a target database, through a backup path comprised by a disaster-recovery network, where each non-database node of the disaster-recovery network hosts a unique SATC (Synchronous-to-Asynchronous Converter) of a plurality of SATC modules, and where a synchronous replication of a transaction from a predecessor SATC on the backup path to an adjacent successor SATC on the backup path comprises storing local copies of the transaction in local persistent storage areas of the predecessor SATC and the successor SATC;

the processor identifying a range of partially replicated transactions of the source database that have not been replicated to the target database;

the processor pausing any ongoing data-restoration operations;

the processor generating one or more sets of tracking entries, where each set of the one or more sets associates one transaction of the partially replicated transactions with a recovery path, through the disaster-recovery network, from the target database to the source database;

the processor locating previously stored copies of one or more of the partially replicated transactions in local storage areas of SATCs on the recovery path;

the processor waiting until the located transaction copies have been replicated to the target database; and the processor restarting any paused data-restoration operations.

DETAILED DESCRIPTION

Figure 1:
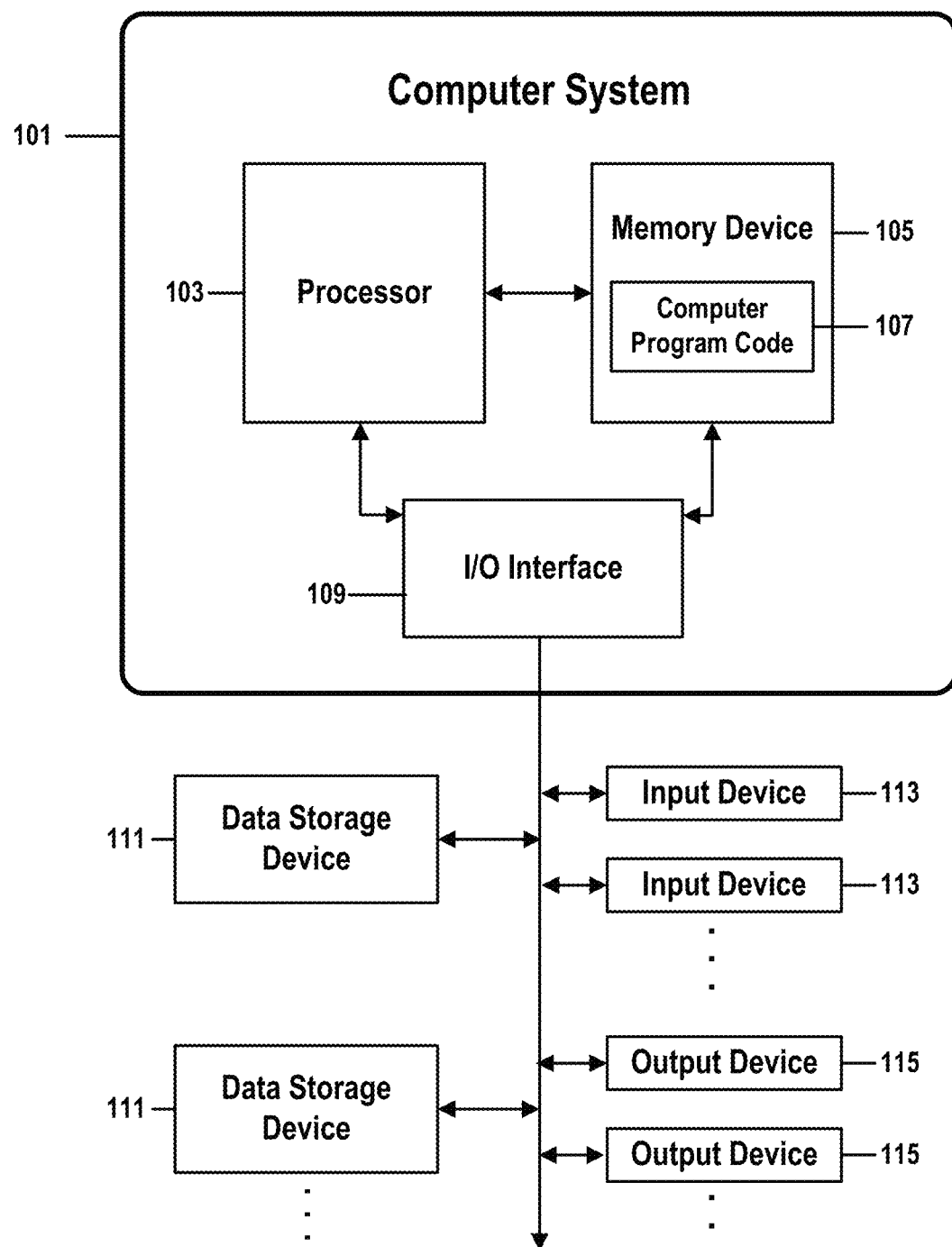
FIG. 1 shows the structure of a computer system and computer program code that may be used to implement a method for site-consolidated disaster-recovery with synchronous-to-asynchronous traffic conversion in accordance with embodiments of the present invention.

Modern-day disaster-recovery systems comprise policies, software tools, and procedures that enable a business to resume normal operation as quickly as possible after a catastrophic data loss. These systems automatically backup and restore lost IT resources required by the business, such as data stored in databases or other repositories, transactional records, application-configuration data, system software, error logs, and other software entities.

Known disaster-recovery systems generally operate by capturing such elements of production data as each element is created and stored on a source data repository. Captured data is copied to "target" backup systems at one or more remote recovery sites. Such disaster-recovery systems may continuously capture and copy production data as each data element is created, or may periodically copy aggregated collections of production data according to a backup schedule.

When a disaster renders data stored on some or all of the production servers inaccessible or unreliable, the disaster-recovery system responds by restoring the backup copies from the target systems to known-good servers or other information repositories from which the backed-up data may be accessed by users.

Disaster-recovery systems generally require a distinct backup or recovery process for each source repository. For example, if a site of a distributed enterprise network comprises 200 databases, a sitewide disaster-recovery system may comprise 200 dedicated software procedures that each monitor and backup one of those databases. This is a technical problem that exists in current disaster-recovery technology that may require an enterprise's network infrastructure to support hundreds or even thousands of distinct datastreams and network connections.

Furthermore, known disaster-recovery systems generally cannot recover the final database transactions that occurred shortly before a catastrophic data loss if those final transactions did not have time to replicate through a network all the way from a source database (the database being protected by the DR system) to a target backup database.

Embodiments of the present invention provide a technical improvement to existing disaster-recovery technology because they comprise methods and systems that improve the efficiency, speed, and accuracy of backup and recovery procedures by consolidating an entire site's disaster-recovery traffic into a single data stream.

The present invention further improves the current state-of-the-art of disaster recovery technology by inserting novel "synchronous-to-asynchronous converters" (or "SATC" units) along paths throughout the back-end inter-site network infrastructure. These SATCs transfer data between source and target servers through disaster-recovery pathways called "disaster-recovery pipes" ("DR pipes") that use improved "synchronous" backup and recovery procedures that are more robust than current "asynchronous" methods.

Each source database that is protected by a DR system and each corresponding target database that stores the DR system's backup of the source database may be connected by one or more distinct sequences of SATCs along one or more paths of the DR network. When a transaction is performed on the source database, the source database engine logs the transaction in the source database's persistent storage area and forwards the transaction through the network path. The transaction is propagated along the path, through each SATC in the sequence, to the target database. When an SATC in the sequence receives the transaction, that SATC stores the transaction in the SATC's local persistent storage, forwards the transaction to its successor SATC along the path, and returns confirmation to the SATC's predecessor in the path when the SATC receives confirmation that the successor has successfully stored the forwarded transaction.

The terms synchronous replication and asynchronous replication are used here to identify methods of confirming the successful receipt and storage of a transaction or other type of data communication by a database or SATC along the network path.

Figure 5:
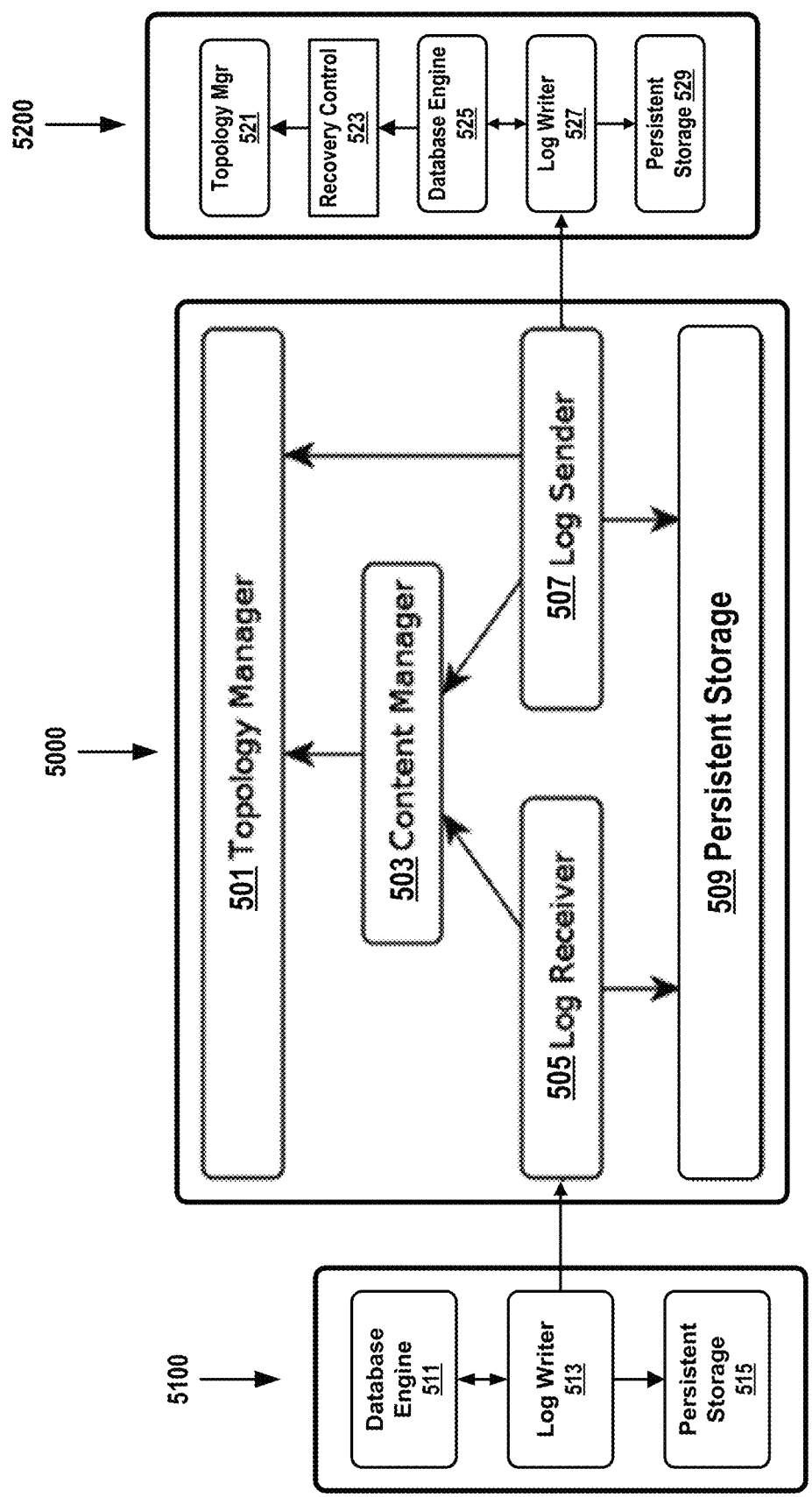
FIG. 5 shows details of an architecture of a synchronous-to-asynchronous interface of an improved disaster-recovery network, in accordance with embodiments of the present invention.

An asynchronous data transfer from a first predecessor system to a first successor system (such as a predecessor SATC 5100 and a successor SATC 5000 of FIG. 5, a source database 5100 and a successor SATC 5000, or a predecessor SATC 5000 and a target database or successor SATC 5200) is considered to be completed when the first successor confirms to the first predecessor that the first successor has successfully received and stored the transferred data in the first successor's local persistent storage 509.

However, a synchronous data transfer from a first predecessor system to a first successor (such as a first predecessor 5100 and a first successor SATC 5000 in FIG. 5) is not considered to be completed until the first successor confirms to the first predecessor that the first successor has:

i) received and stored the transferred data in the first successor's local persistent storage 509;

ii) forwarded the transferred data to a second successor system (such as a successor 5200 in FIG. 5); and iii) has received confirmation from the second successor 5200 that the second successor 5200 has stored the transferred data in the successor 5200's local persistent storage 529.

In other words, when data is replicated asynchronously through a daisy-chain of SATCs or other systems, each transfer between a pair of adjacent systems is considered to be completed when the receiving system confirms to the sending system that the receiving system has successfully received and stored the transferred data. But when data is replicated synchronously, a two-system transfer is considered completed only when the receiving system confirms to the sending system that the transferred data has been successfully received and stored both in the receiving system's persistent storage and in the persistent storage of one or more downstream systems in the daisy-chain.

Known disaster-recovery systems support only asynchronous replication procedures, which, although less robust, may be faster and easier to implement than synchronous replication. The present invention comprises synchronous-to-asynchronous converters 5000 that translate source data streams, which originate by means of asynchronous transfers from a source database, into a sequence of synchronous SATC-to-SATC data transfers; and then asynchronously store the transferred data in a target database. As will be described in the following figures, these synchronous replication procedures provide greater robustness and accuracy during a recovery procedure, and reduce the likelihood that the DR system will be unable to recover database transactions that had been logged just before the occurrence of a catastrophic event.

During a recovery operation, synchronous communications enable a compliant improved disaster-recovery system to locate transactions of a source database that have not yet had time to reach a target database, or had been lost en route to a target database when a catastrophic failure occurred. As described in FIGS. 9 and 10, embodiments of the present invention improve upon current DR systems by implementing a reverse synchronous procedure called a "priority procedure," which synchronously traces lost transactions through a network path in reverse direction from a target database to the transactions' original source databases. Such a priority procedure allows the DR system to find otherwise-lost transactions that had been stored in SATCs along the network path, even if those stored transactions never reached the backup target database.

These improvements also allow network-management systems to more easily measure a disaster-recovery system's performance characteristics and resource consumption. Instead of forcing a network to manage large numbers of constantly varying data streams, embodiments of the present invention allow a network-management system, such as a cloud-management platform, to handle an entire site's disaster-recovery traffic as a single consolidated stream. These improvements also allow a disaster-recovery system to quickly locate and recover database transactions that would otherwise have been lost during the catastrophic data-loss event. Finally, these improvements mitigate burdens imposed by known DR technology on network-management platforms, allowing network-management applications to more easily perform tasks like measuring resource consumption and latency, determining when and how to throttle bandwidth, dynamically rerouting traffic, and implementing encryption procedures.

None of these improvements are incorporated in known disaster-recovery applications and technology and are not well-understood, conventional, or routine within the field of disaster-recovery technology.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows a structure of a computer system and computer program code that may be used to implement a method for site-consolidated disaster-recovery with synchronous-to-asynchronous traffic conversion in accordance with embodiments of the present invention. FIG. 1 refers to objects 101-115.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for site-consolidated disaster-recovery with synchronous-to-asynchronous traffic conversion in accordance with embodiments of the present invention, and may implement other embodiments described in this specification, including the methods illustrated in FIGS. 1-10. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for site-consolidated disaster-recovery with synchronous-to-asynchronous traffic conversion.

Any of the components of the present invention could be created, integrated, hosted, maintained, deployed, managed, serviced, supported, etc. by a service provider who offers to facilitate a method for site-consolidated disaster-recovery with synchronous-to-asynchronous traffic conversion. Thus the present invention discloses a process for deploying or integrating computing infrastructure, comprising integrating computer-readable code into the computer system 101, wherein the code in combination with the computer system 101 is capable of performing a method for site-consolidated disaster-recovery with synchronous-to-asynchronous traffic conversion.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 107 for a method for site-consolidated disaster-recovery with synchronous-to-asynchronous traffic conversion may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for a method for site-consolidated disaster-recovery with synchronous-to-asynchronous traffic conversion is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
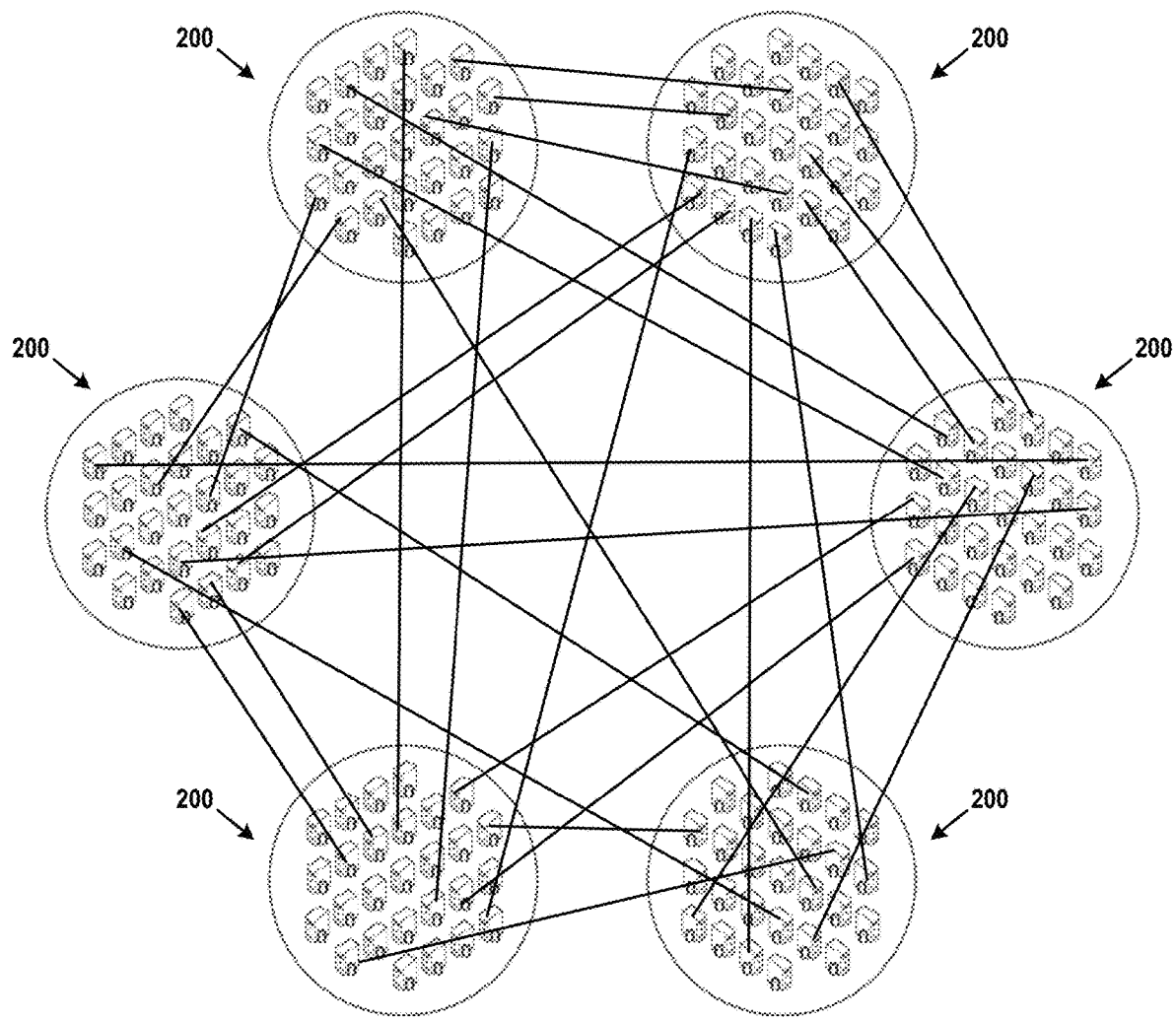
FIG. 2 shows a generalized overview of an architecture of a conventional disaster-recovery system.

FIG. 2 shows a generalized overview of an architecture of a conventional disaster-recovery system. The example of FIG. 2 comprises six instances of data-center sites 200, but this example should not be construed to limit embodiments to DR implementations that comprise six sites.

Known disaster-recovery (DR) technology operates by establishing a component-specific link between each production database, server, or other information repository of source data, and one or more "target" servers to which the production data is backed up by a DR system.

FIG. 2 represents such architectures in a general, non-rigorous manner by showing subsets of the many links between each site 200 of an enterprise network's production sites and its disaster-recovery sites. Each connection represents a network link between a source repository at a production site and a target backup server at a disaster-recovery site.

Although some DR implementations may not mix source and target servers at a same site 200, the generalized example of FIG. 2 shows a case in which each data center hosts both source and target information repositories. In this figure, however, no target database is used to back up a source database at the same site. Although not an essential element of DR systems described in this document, most implementations store recovery data at a site that is physically distinct from the site of the source data.

FIG. 2 is intended to graphically represent the fact that disaster-recovery systems require many distinct connections between data-center sites. This complexity makes it difficult or impossible to manage disaster-recovery traffic at a data-center level, rather than at a server level, forcing network-management systems to assume the brunt of traffic management using only poorly suited network-management tools. The need for large numbers of independent data streams also prevents a network-management platform or cloud-management facility from easily monitoring a disaster-recovery system's quality-of-service characteristics, such as latency, or the system's traffic characteristics, such as an amount of bandwidth required by each connection or a total aggregate bandwidth used by an entire site 200.

Figure 3A:
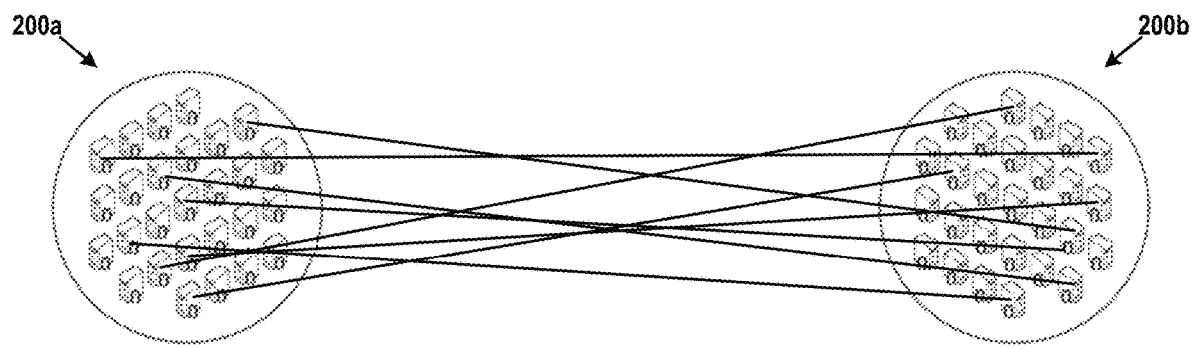
FIG. 3A shows a two-site detail of the disaster-recovery architecture of FIG. 2.

FIG. 3A shows a two-site detail of the disaster-recovery architecture of FIG. 2. FIG. 3A shows connections between two instances of element 200.

The two data-center sites 200 in FIG. 3A are similar in form and function to the data centers 200 of FIG. 2, which each contain multiple data repositories. In FIG. 3A, a distinct network link connects each source component of one of the two sites 200 to a corresponding target component of the other site 200. A DR system would use each link to copy data between one of the corresponding component pairs. For example, if a source component at one site hosts a "source" production database and a target component at the other site hosts a "target" backup database, the disaster-recovery system requires a distinct network connection in order to transfer copies of each data element or database transaction logged into the source database's local persistent storage to persistent storage of the backup database.

Known DR systems suffer from weaknesses that arise from this component-to-component link architecture, which can result in a disaster-recovery system requiring a large number of distinct, independently managed data paths. In more complex implementations, where a single data site's components are backed up to more than one backup site, a disaster-recovery topology can be even more complicated. This complexity prevents the creation of a single point of control for managing an entire site, making network-management and disaster-recovery management tasks cumbersome or impossible.

Figure 3B:
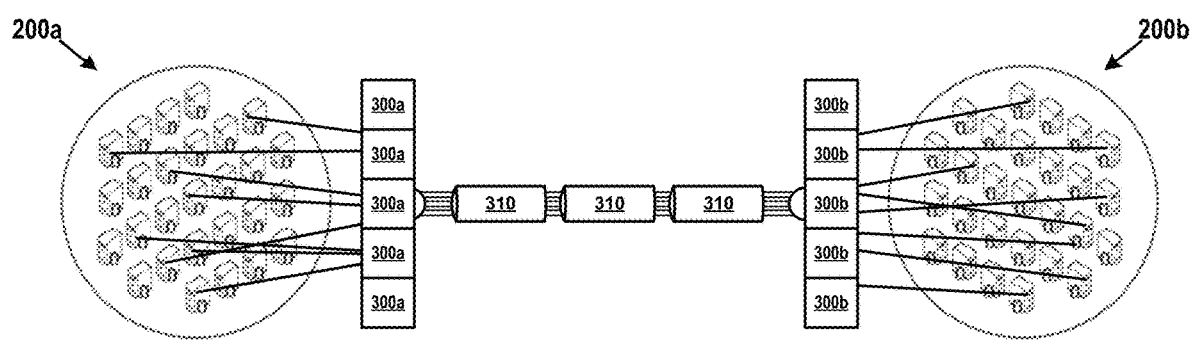
FIG. 3B shows an improved disaster-recovery system comprising an application of the present invention to the two-site architecture of FIG. 3A.

FIG. 3B shows an improved disaster-recovery system comprising an application of the present invention to the two-site architecture of FIG. 3A. FIG. 3B identifies elements 200a, 200b, and 300-310.

Items 200a and 200b represent the same type of data-center sites 200 shown in FIGS. 2 and 3A. Sites 200a and 200b are also each associated with the same plethora of data connections described in the earlier figures.

Here, however, the plurality of disaster-recovery component-specific data streams of source production site 200a are consolidated by a first bank of synchronous-to-asynchronous converter (SATC) modules 300a into a single stream. The consolidated stream is then transmitted by the first SATCs 300a through a disaster-recovery (DR) network composed of a network of DR pipes 310 to a second bank of SATCs 300b, which restore the consolidated stream back to a set of component streams. Each DR pipe 310 may be implemented as one or more network segments or high-speed communications links, as is known in the art. Each stream then delivers backup data to a distinct backup database at one or more target backup sites 200b.

FIG. 3B thus illustrates in a general manner one advantage of the present invention. By consolidating a large number of distinct network connections into a consolidated data stream that may be transferred through a network path of DR pipes, the present invention's improved DR technology provides a single point of control from which an entire data center's disaster-recovery traffic may be monitored, measured, encrypted, routed, or otherwise tracked or managed by a network-management platform or by the disaster-recovery system itself.

Figure 4:
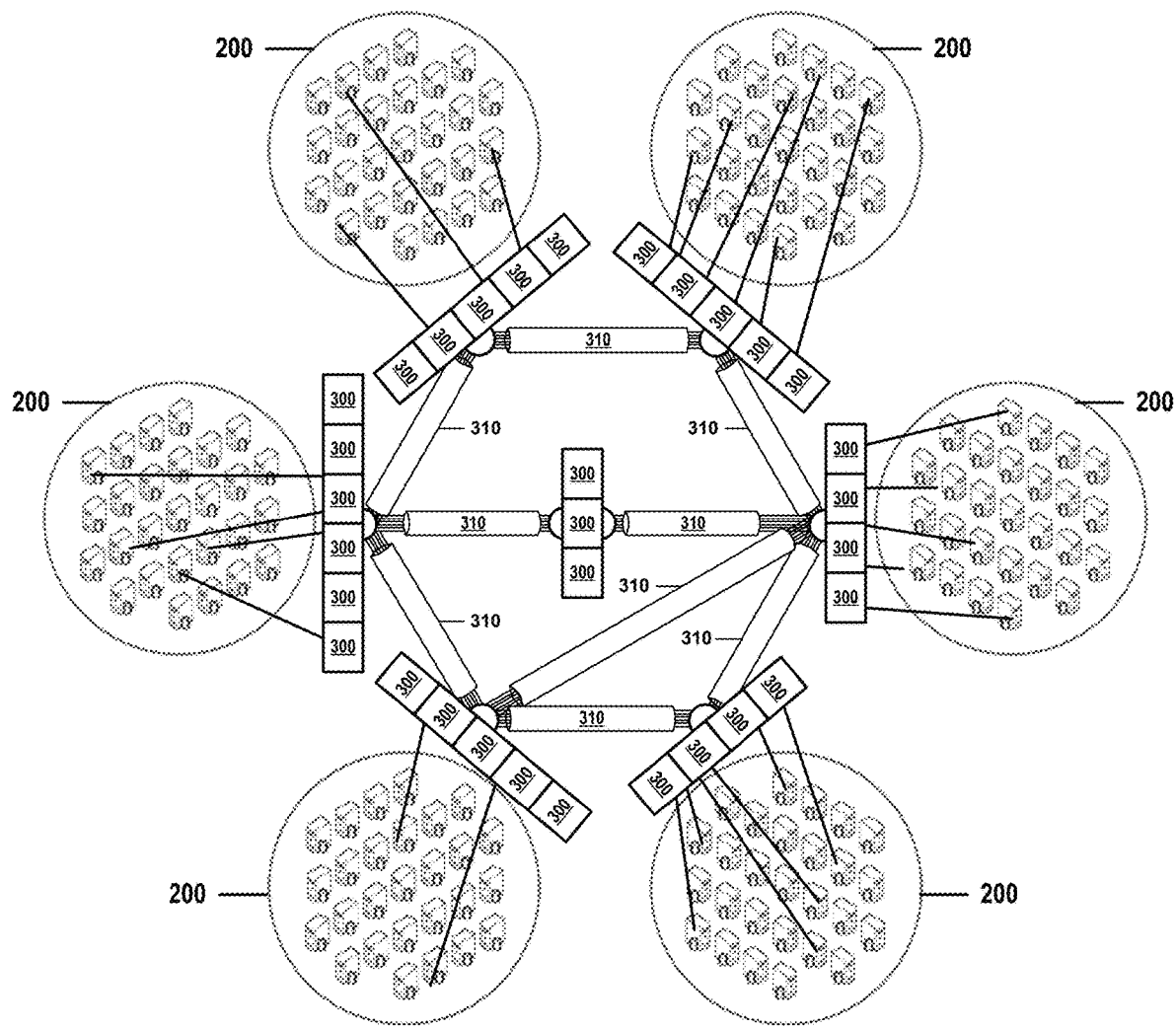
FIG. 4 illustrates an application of FIG. 3B's improved disaster-recovery system to the enterprise of FIG. 2.

FIG. 4 illustrates an application of FIG. 3B's improved disaster-recovery system to an enterprise similar to that of FIG. 2. FIG. 4 shows elements identified by reference numbers 200 and 300-310.

Data-center sites 200 are similar in form and function to sites 200 of FIG. 2, SATC banks 300 are identical in form and function to the SATC banks 300a and 300b of FIG. 3B, and DR pipe 310 is identical in form and function to DR pipes 310 of FIG. 3B.

As in FIG. 3B, each bank 300 of SATC modules consolidates database-backup data streams originating from source databases of a site 200 into a single consolidated stream and forwards the consolidated stream across a DR network comprised of DR pipes 310.

In a more general case, a single SATC bank 310 may consolidate data streams associated with more than one site 200, or a single site 200 may data generate streams that are consolidated by more than one SATC bank 310. Such embodiments are not included in the examples shown in the figures, but are within the scope of the present invention.

The consolidated data streams travel along network paths between source and target databases located at various sites 200. Each network path may consist of an arbitrary number of SATC modules connected by DR pipes 310 and, as a data item traverses a network path, each SATC along the way stores a copy of the data item in the SATC's local persistent-storage area. In this way, transactions and data items originating from a source database at a first datacenter site 200 are replicated and stored at each step along a network path to a target database at a second datacenter site 200.

Other embodiments may comprise variations of this architecture, but in all cases, a plurality of component data streams originating at a first source site 200 are consolidated by one or more banks 300 of SATCs into one or more aggregated (possibly site-specific) data streams that are transferred through the high-speed DR pipes 310 to a sequence of other SATCs. When the data stream reaches its target-database destination, the last SATC along the path reverses any aggregation, unpacking the consolidated data stream into component data streams that deliver the original data to appropriate backup systems at a target site 200.

Figure 6:
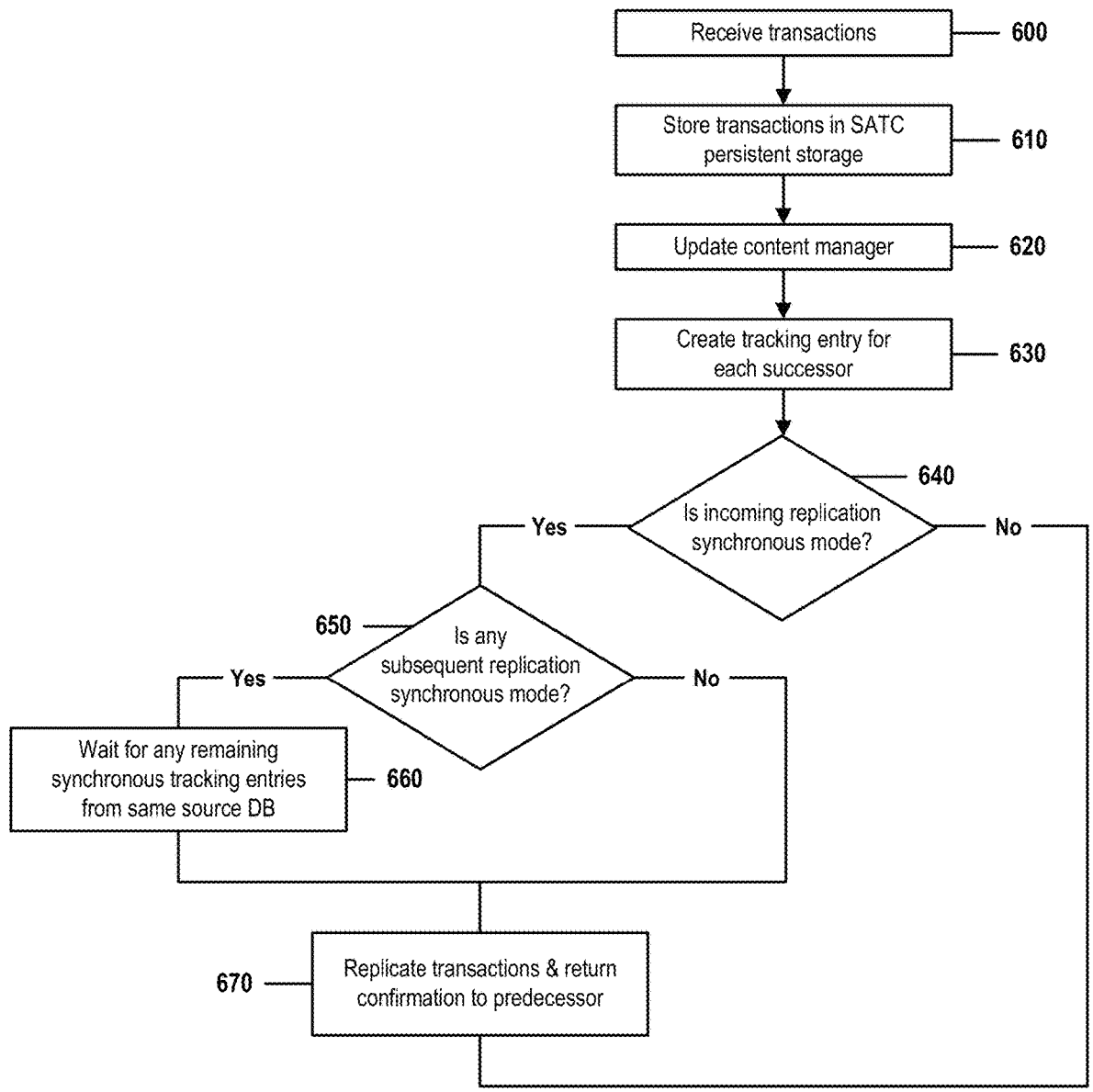
FIG. 6 is a flow chart that shows steps of a method for processing incoming transactions by a synchronous-to-asynchronous converter, in accordance with embodiments of the present invention.

Data replication between SATC modules along a DR network path are performed in a synchronous manner, where the term "synchronous" is given the narrow meaning defined above and in FIGS. 5 and 6. Here, a synchronous replication stream requires a predecessor/successor pair of SATCs to confirm a successful data transfer only when the successor in turn confirms that the successor has successfully transferred the data received from the predecessor to a third SATC further downstream.

When a disaster occurs, this data flow is reversed. Streams of backed-up data stored on a target database at a target site 200 may be consolidated by one or more SATCs 300 into a consolidated data stream; the consolidated stream is transmitted along a recovery data path through DR pipes 310, ultimately reaching a final set of SATCs that decompose the consolidated stream into component data streams. These final data streams are then restored to a set of recovery servers that provide users access to the data that had become inaccessible on the original source servers. In some embodiments, the recovery servers may not be distinct from the original source servers when the source servers are capable of being returned to service.

These improved recovery procedures also include a "priority process" procedure that uses synchronous communications methods to locate and recover database transactions and other data that had not been fully backed up at the time that a catastrophic data-loss event had occurred.

This improved disaster-recovery technology provides benefits over known DR systems, such as allowing a system platform to more easily monitor bandwidth and latency of an entire disaster-recovery system or of DR traffic related to a specific data center or site by simply monitoring a consolidated stream traveling through a DR pipe. This technology also provides other benefits, such as an ability to route a specific site's DR-related traffic through a particular path, to prioritize or bandwidth-limit DR traffic by site, and to recover source-database transactions would otherwise have been lost. Other benefits include an improved ability to allow disaster-recovery traffic to be encrypted on a per-site basis, even if individual components protected by the DR system do not themselves support encryption.

None of these innovations are currently in use in disaster-recovery systems based on known technology, much less so widely in use that they might be considered well-understood, routine, and conventional in the field.

FIG. 5 shows details of an architecture of a synchronous-to-asynchronous interface of an improved disaster-recovery network, in accordance with embodiments of the present invention. FIG. 5 shows elements identified by reference numbers 501-529, and 5000-5200. Item 5000 depicts details of the synchronous-to-asynchronous converter (SATC) modules identified by reference numbers 300, 300a, and 300b in FIGS. 3 and 4.

In order to better describe more generalized embodiments of the present invention, the remainder of this Specification will generally refer to "source," "target," "production," or "backup" servers as "predecessor" and "successor" systems. Here, a predecessor is simply a database, server, computer system, SATC, or other networked entity that is a source for data transmitted to a successor database, server, computer system, SATC, or other networked entity. In other words, predecessor and successor terminology indicates an order in which a pair of entities are located along a data path, not the intrinsic nature or functionality of the entities themselves.

In FIG. 5, this terminology will be used to describe relationships between:

a predecessor entity 5100 that may be a source database, which stores production data to be protected by the disaster-recovery system, or a predecessor SATC;

a successor 5200 entity, which may be a target or backup database that stores backup copies of a source database's production data, or a successor SATC; and a sequence of intermediary SATCs 5000, which transfer database transactions and other data items passing between a source database and a target database.

In embodiments and methods described in FIGS. 6-10, a disaster-recovery system of the present invention operating in normal data-capture and backup mode comprises an SATC 5000 module capturing transactions generated by and stored on a source database 5100 and then forwarding those transactions synchronously through a sequence of other SATCs 5000 configured along network paths of DR pipes 310 to one or more target databases 5200. During a data-recovery operation, after the occurrence of a catastrophic event, this data flow is reversed. The DR system transfers the previously stored data from the target database 5200 through a sequence of SATCs 5000 along a network path of DR pipes 310 to a recovery system accessible by users. In some embodiments, the recovery system may be the original source system, but in other embodiments, the recovery system and the source system are distinct.

In either case, each SATC 5000 receives data from a predecessor entity 5100, stores the received data in the SATC's local persistent storage area 509, and forwards the received data to a successor entity 5200. Depending on the SATC's location in the DR network topology and on the operation being performed, these predecessor and successor entities may be a source database, a target database, or another SATC module.

Referring in particular to FIG. 5, the three main modules shown in the figure are: one or more synchronous-to-asynchronous converters (SATC) 5000 that, during a backup operation, translate an incoming data stream, originating from a source database, into an outgoing data stream to be stored in a target database. As described above, and shown in FIG. 4, embodiments of the present invention may comprise complex networks of SATCs 5000, which can provide multiple possible paths between various source and target databases. One or more SATC 5000 modules may be located at each junction of DR pipes 310 comprised by the DR network.

During the DR system's normal backup mode, if predecessor 5100 is a source database, database engine 511 responds to a database-access request by one or more local applications by performing a transaction upon the source database. Log writer component 513 then logs the transaction on a persistent, non-transitory storage medium 515.

Unlike conventional DBMS implementations, log writer 513 also transmits a copy of each transaction to a log receiver 505 component of SATC 5000, either through any communications infrastructure and method known in the art. Each SATC 5000 may be connected to a large number of predecessor databases 5100 in this manner. In some embodiments, a particular bank of SATCs 5000 may all be connected to databases 5100 at a particular data-center site 200 or 200a.

The SATC 5000's log receiver 505 stores received transactions in the SATC's own non-transitory persistent storage area 509. Log receiver 505 also requests that a content manager module 503 create header information for each received transaction. This information may include characteristics of a transaction, such as an identifier of the transaction's originating database or system, an identifier of a characteristic of a target database to which the transaction will ultimately be persisted, or other information specifying transaction characteristics like a creation time, a size, or a priority.

A topology manager module 501 uses information accumulated by the content manager 503 to determine how the SATC 5000 should process each transaction received by the log receiver 505. This determination may comprise enumerating a sequence of successor systems 5200 through which the transaction should be replicated in order for the transaction to reach the target database, as well as other data identifying the current status of the transaction on each successor system. This operation is facilitated by retrieval of certain types of information managed by the topology manager 501, such as a list of source databases that contain production data to be captured and backed up by the disaster-recovery system, a list of potential predecessor and successor systems connected by DR pipes 310, a list of target databases capable of backing up data captured from the source database, and an overall topology of the disaster-recovery system's network, including all possible network paths between source and target sites 200, 200a, and 200b.

The log sender 507 module of SATC 5000 receives information from the content manager 503 that provides connectivity details for other entities in the disaster-recovery system, including paths to the successor database 5200. The log sender 507 then retrieves the stored transaction from the SATC's persistent storage area 509 and uses the received connectivity information to route the transaction to the correct successor 5200.

Log writer 527 of the successor database 5200 receives the transaction from SATC 5000 and, under direction of database engine 525, stores the received transaction in the successor database 5200's persistent storage 529. These steps are performed in a conventional manner, as is known in the field of database-management systems, and in some embodiments, the persistent storage 529 is a "target" database to which backed-up data is stored.

Like the SATC's topology manager 501, the successor system's topology manager 521 stores descriptions of the topology of the disaster-recovery system and the entities that it monitors. This information is used by the successor system 5200's recovery control component 523 during a data-recovery operation. During such a recovery, recovery control 523 first retrieves all captured database transactions associated with a backup database on the persistent storage device 529 that are still in transit within SATC components 300, 300a, or 300b within the network of DR pipes 310. Recovery control 523 then forwards those retrieved transactions to the database engine 525 in order to ensure that the backup database is fully current. The disaster-recovery system then restores the backup database to a new production server from which users may access the recovered data These procedures are described in greater detail in FIGS. 6-10.

FIG. 6 is a flow chart that shows steps of a method for processing incoming transactions by a synchronous-to-asynchronous converter 5000, in accordance with embodiments of the present invention. FIG. 6 contains steps 600-670, which may be performed by embodiments that incorporate the data structures of FIGS. 1-5.

In this figure, one or more source databases 5100 are connected through a network of SATC modules 5000 to one or more target databases 5200. During normal operation, a disaster-recovery system, in accordance with embodiments of the present invention, captures each transaction submitted to a source database 5100 and copies that transaction, through the network, to a corresponding target backup database 5200. Each transaction passes through a sequence of SATCs 5000 through the network, with each SATC 5000 receiving data from a predecessor SATC 5000 (or the original source database 5100) and forwarding that data to a successor SATC 5000 (or the ultimate target database 5200).

During a recovery procedure, this procedure would be reversed. Data previously backed up to a target backup database is transferred through a sequence of SATCs 5000 to a source or recovery database that will make the information available to users. Again, each SATC 5000 in the sequence forwards data from a set of predecessor systems to a set of successor systems. Predecessors of a particular SATC during a recovery process may not be the same systems that operated as that SATC's predecessors or successors during the original backup phase. Similarly, successors of a particular SATC during a recovery process may not be the same systems that operated as that SATC's predecessors during the original backup phase.

Prior to initiating a recovery, each SATC 5000 performs a novel "priority process" procedure that ensures that the backup database has been updated with all transactions that were in transit at the time of the catastrophic event. This priority process comprises propagating a request for any outstanding transactions in reverse order through all predecessor systems along the path back to the source database. The requesting SATC 5000 then waits for all predecessors to confirm that every transaction locally stored by one of the predecessors has been successfully stored in the target database's persistent storage. These operations are described in greater detail in FIGS. 9 and 10.

Figure 7:
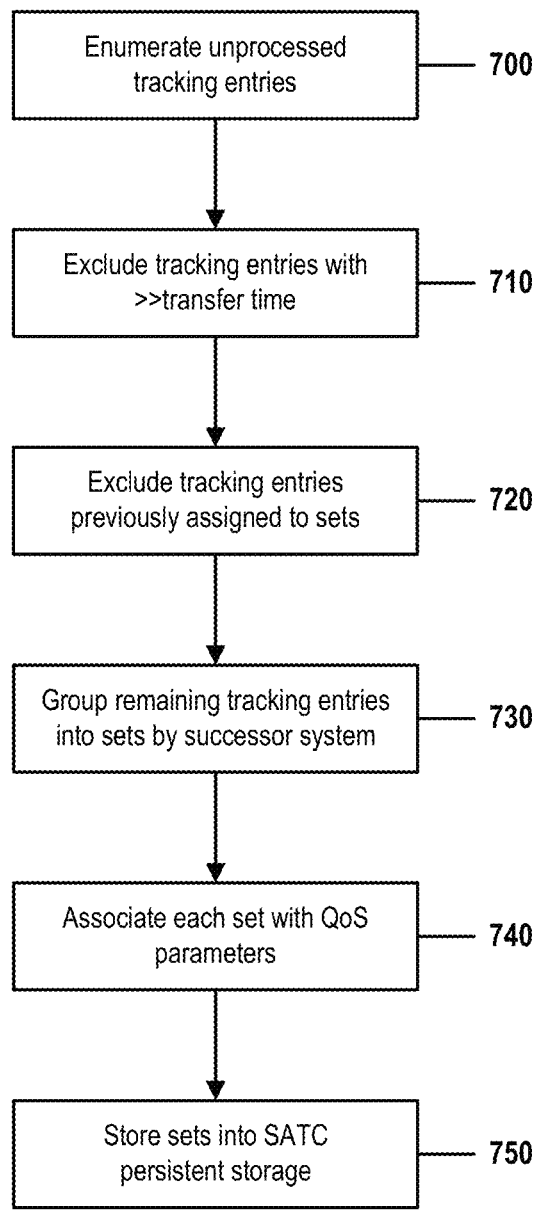
FIG. 7 is a flow chart that shows steps by which a content-manager module of a synchronous-to-asynchronous converter creates and stores sets of tracking entries, in accordance with embodiments of the present invention.
Figure 8:
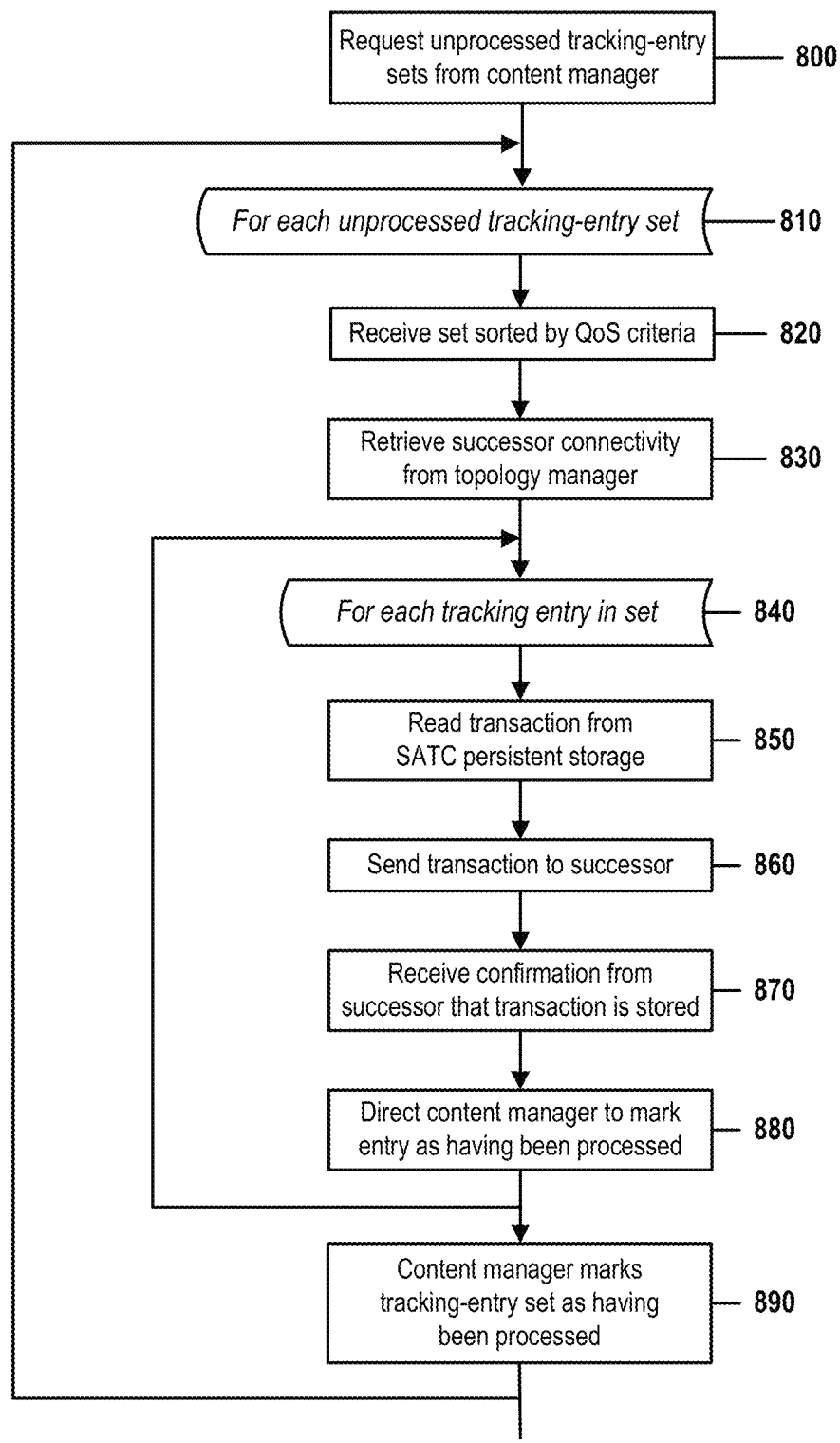
FIG. 8 is a flow chart that shows steps by which a log-sender module of a synchronous-to-asynchronous converter forwards received database transactions to successor systems during a backup operation, in accordance with embodiments of the present invention.

The steps described in FIGS. 6-8 overview steps taken by a disaster-recovery system, during the data-backup phase, by which an SATC 5000 located along a network path between a source database and a target database transfers transactional records from the source database to the target database. In some embodiments, this SATC 5000 may be one of a sequence of SATCs 5000 located along a path connecting the source and target database. As described above, each SATC 5000 along the path is preceded by a first sequence of predecessor SATCs 5000 and followed by a second sequence of successor SATCs 5000.

In step 600, an SATC 5000 receives from a predecessor system 5100 one or more database transactions that have been recorded to persistent storage 515 of the predecessor system 5100. These database transactions may have originally been generated by users of a source database, which is being monitored and backed up by the disaster-recovery system, and then passed to the predecessor system 5100 through a sequence of other SATCs via the disaster-recovery (DR) network 310. These transactions may be received by the SATC 5000's log receiver module 505 from a log writer module 513 of the predecessor system 5100.

In step 610, log receiver 505 stores the received transaction or transactions in the SATC 5000's persistent storage area 509.

In step 620, log receiver 505 notifies content manager 503 that the received transactions have been stored in the SATC's local persistent storage 509. The log receiver also transmits to content manager 503 a unique transaction ID for each received transaction.

In step 630, content manager 503 retrieves from topology manager 501 a list of successor systems through which the received transactions must be passed in order to transmit the received transactions to their ultimate destination, a target backup database system. Topology manager 501 is able to provide this information by maintaining a current representation of the disaster-recovery network topology.

The content manager 503 then generates a series of tracking entries for each received transaction, where each tracking entry identifies one of the successor systems through which the received transaction must pass in order to reach the target database. FIG. 7 describes these procedures in greater detail.

In some embodiments, the tracking entries generated in this step may each identify only a direct successor system 5200 to which the SATC 5000 can directly forward a transaction. In such embodiments, no tracking entries generated in this step identify successor systems that are not capable of directly exchanging data with SATC 5000 with no intervening systems.

In step 640, SATC 5000 determines whether the received transactions have been marked as requiring a synchronous replication mode. As mentioned above, the terms synchronous replication and asynchronous replication are used in this document in a specific, narrowly defined manner to identify methods of confirming the successful receipt and storage of transaction data through, or other type of data-replication task, through a chain of networked systems.

If the received transactions are marked as not requiring synchronous replication, the method of FIG. 6 ends. If the received transactions are to be replicated synchronously, then the method of FIG. 6 continues with steps 650-670.

In step 650, SATC 5000 determines whether any remaining transactions, not yet processed by SATC 5000, for the same source database will require synchronous replication. If no other synchronous replications are required, then SATC 5000 skips step 660 and continues with step 670.

In step 660, because other synchronous replication tasks remain, SATC 5000 waits for all associated tracking entries for each remaining synchronous transaction to be received and processed. As described earlier, each tracking entry will identify a successor system through which a remaining transaction will be propagated in order to store that transaction in the target database. In this step, therefore, SATC 5000 will wait for the arrival of tracking entries that each identify the same source system, a transaction ID of an outstanding transaction originating from that source system, and a successor system through which the transaction identified by the transaction ID must be replicated in order to be transferred to the desired target system.

In step 670, SATC 5000 synchronously replicates any synchronously received transactions through the path of successor systems identified by the tracking entries. At the conclusion of this procedure, SATC 5000 will receive confirmations that the received transactions have been successfully replicated to the target database. Log receiver 505 will then respond to predecessor system 5100 with confirmation that the target database's persistent storage has been successfully updated. This confirmation will then be propagated by predecessor system 5100 through the predecessor portion of the system chain, back to the original source database.

FIG. 7 is a flow chart that shows steps by which a content-manager module 503 of a synchronous-to-asynchronous converter (SATC) 5000 creates and stores sets of tracking entries, in accordance with embodiments of the present invention. FIG. 7 contains steps 700-750, which may be performed by embodiments that incorporate the data structures of FIGS. 1-5.

Embodiments of the present invention generate and associate a transaction ID and a set of tracking entries for each transaction of the source database that is captured, backed up to a target database, and, in the event of a recovery operation, restored to a new production database. These tracking entries allow embodiments to trace database transactions through sequences of SATCs 5000 when performing synchronous procedures, such as a synchronous backup operation that copies a transaction from a source database, through a network of DR pipes and SATCs 5000, to a target database; a synchronous recovery operation that copies a previously backed-up transaction from a target database, through a network of DR pipes and SATCs 5000, to a recovery database; or a priority-process operation that traverses a network of DR pipes and SATCs 5000 in reverse order, from a target database back to a source database, in order to locate lost copies of database transactions that were still in transit to a target database when a catastrophic event occurred.

Each such transaction is uniquely identified by a unique transaction ID and is accompanied by its transaction ID as the transaction is routed through a networked chain of SATCs 5000 from a source database to a target database or from a target database to a recovery database.

The path through which a transaction is routed is identified by that transaction's set of tracking entries. Each entry identifies one SATC 5000 in the chain of SATCs 5000 that connect the transaction's originating database and destination database.

Each SATC 5000 contains a content manager module 503 that stores and maintains tracking information about transactions that are captured, backed up, or restored by the disaster-recover (DR) system. The method of FIG. 7 describes operations of content manager 503 performed in order to create a new tracking entry when an SATC 5000 receives from a predecessor system 5100 one or more new database transactions that will need to be backed up. This procedure elaborates upon step 630 of FIG. 6.

In step 700, content manager 503, having received a transaction ID for each received, but as-yet unprocessed, transaction stored in the SATC's persistent storage 509, requests from topology manager 501 a list of all SATC modules 5000 along each received transaction's path from the transaction's source database to the transaction's destination database.

For each transaction, content manager 503 then uses these lists to generate a set of tracking entries for each unprocessed transaction identified by one of the received transaction IDs. Each tracking entry identifies one of the SATC modules 5000 along the path associated with a corresponding transaction. At the conclusion of this step, content manager 503 will have generated a set or list of tracking entries for each transaction stored in the persistent storage 509, where each set or list identifies a sequence of SATCs 5000 that one of the transactions would need to traverse in order to reach the transaction's destination.

In some embodiments, a method of FIG. 7 may be varied to perform steps 710 and 720 prior to generating the sets or lists of tracking entries. Such embodiments may in certain implementations improve efficiency by eliminating the step of generating tracking entries that are subsequently excluded, even if only temporarily, from further processing.

In step 710, content manager 503 optionally excludes certain of the sets of tracking entries from being processed by further steps of methods of FIG. 7. This delays the replication of any transactions associated with the excluded entries in order to prevent replication of certain logical errors that may have affected those transactions.

Such logical errors may occur when a transaction has not been stored in persistent storage 509 for a duration of time longer than the nontrivial transfer time necessary for that transaction to have reached storage 509 from a source database. In such cases, content manager 503 in this step excludes further processing of generated tracking entries associated with that transaction until enough time has elapsed to ensure that the stored transaction is accurate and complete.

Other types of logical errors may occur if, for example, a particular source database had been temporarily subject to errors. Transactions received and stored in persistent storage 509 may thus be erroneous until the database has had sufficient time to correct the errors and transfer corrected transactions to storage 509. If not enough time has elapsed since the resolution of the database problem to allow corrections to be transferred to storage 509, content manager 503 will exclude tracking entries associated with the potentially erroneous transactions in order to prevent those transactions from being propagated until corrected transactions can be transferred to storage 509.

In step 720, content manager 503 further excludes other tracking entries if those entries are found to already belong to previously generated tracking-entry sets.

In step 730, content manager 503 groups the remaining tracking entries into new sets, where each set contains all tracking entries that identify a particular successor system 5100. For example, if an SATC 5000 is connected through DR network pipes 310 to five other SATCs, each of which is a potential successor system of SATC 5000, content manager 503 may, in this step, sort the generated tracking entries into as many as five sets. Here, each of the sets would consist of tracking entries that identify one of the potential successors. Because each tracking entry associates one transaction ID with one successor system, the tracking entries in any one of the new sets would identify all non-excluded transactions stored in persistent storage 509 that are to be transferred to one particular successor of the five successor systems.

In step 740, each new set of tracking entries may be assigned one or more quality-of-service (QoS) parameters. These parameters may, for example, identify: an order in which the tracking entries in a particular new set are to be processed; a network priority assigned to all entries in a particular new set; or other QoS parameters that may be assigned to network traffic.

The present invention is flexible enough to accommodate any method known in the art, or preferred by an implementer, for selecting and assigning such QoS parameters to each new set or to each tracking entry in a new set.

In step 750, the content manager 503 returns the new sets of tracking entries to log receiver 505. Log receiver 505 then records the newly created tracking-entry sets into the SATC 5000's persistent storage 509.

FIG. 8 is a flow chart that shows steps by which a log-sender module 507 of a synchronous-to-asynchronous converter 5000 forwards received database transactions to successor systems 5200 during a backup operation, in accordance with embodiments of the present invention. FIG. 8 contains steps 800-890, which may be performed by embodiments that incorporate the data structures of FIGS. 1-5, and that roughly correspond to steps of FIG. 6 that include step 660.

In step 800, the log sender 507 requests a listing of unprocessed tracking-entry sets from content manager 503. These listings had previously been generated by content manager 503 through the method of FIG. 7 and stored in the SATC's persistent storage 509 in step 750.

Step 810 begins an outer iterative procedure of steps 810-890 that is repeated for each tracking-entry set received in response to the request of step 800.

In step 820, log sender 507 receives from content manager 503 one of the requested tracking-entry sets. These sets may be received in an order specified by the QoS parameters associated with each set in step 740 of FIG. 7. For example, if an implementer desires to process older sets first, content manager 503 will transmit sets in order of age. Similarly, if QoS parameters specify that the system should first process sets that have higher network priority, higher-priority sets will be received first.

In step 830, log sender 507 requests from topology manager 501 connectivity information for the particular successor system 5200 associated with the received tracking-entry set currently being processed.

Step 840 begins an inner nested iterative procedure of steps 840-890 that is repeated once for each tracking entry comprised by the tracking-entry set being processed by the outer current iteration of the iterative procedure of steps 810-880.

In step 850, log sender 507 retrieves from the SATC 5000's persistent storage 509 the transaction identified by the transaction ID of the current tracking entry.

In step 860, log sender 507 transmits, through DR pipes 310 of the disaster-recovery network, the transaction retrieved in step 850 to the successor system 5200 identified by the current tracking-entry set.

In step 870, log sender 507 receives confirmation, through the disaster-recovery network, from successor system 5200 that the transaction transmitted in step 507 was successfully received and stored in successor system 5200's persistent storage 529.

In a synchronous replication procedure, the received confirmation further indicates that successor system 5200 itself has received confirmation, from a downstream successor system to which successor system 5200 had replicated the transmitted transaction, that the transmitted transaction has also been successfully received and stored in the persistent storage of the downstream successor system.

In step 880, log sender 507 directs content manager 503 to mark the current tracking entry as having been processed. This will prevent the tracking entry from being included in a future tracking-entry set by a future performance of a method of FIG. 7.

Step 890 is performed after the iterative procedure of step 840-880 has processed every tracking entry of the current tracking-entry set.

In step 890, log sender 507 directs content manager 503 to mark the entire current tracking-entry set as having been processed.

Figure 9:
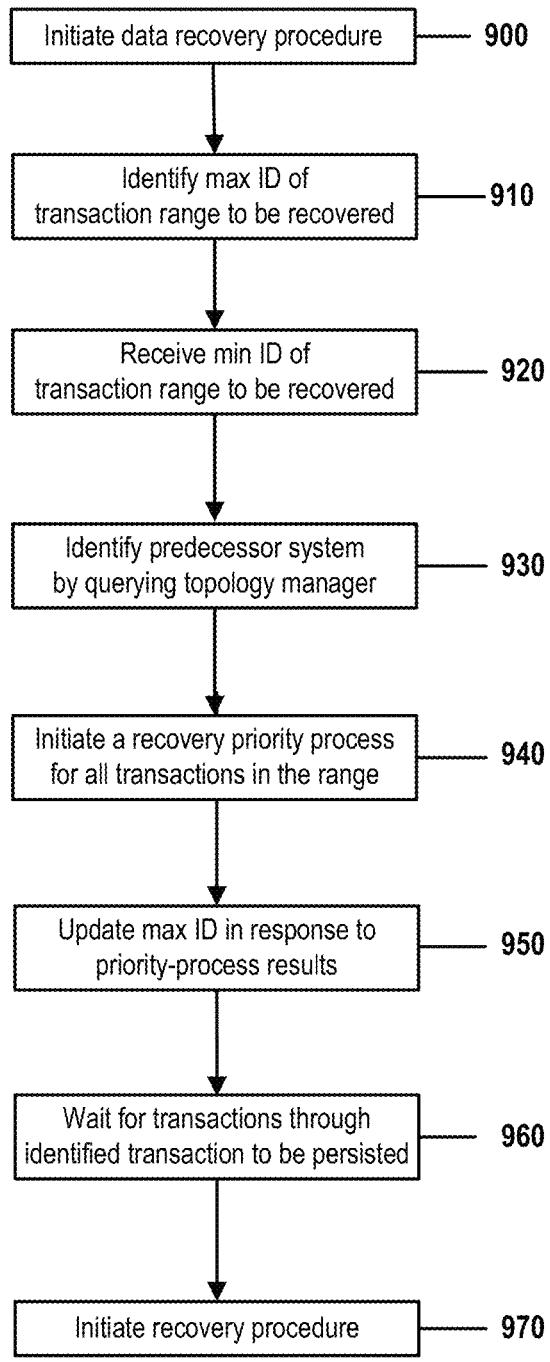
FIG. 9 is a flow chart that shows steps performed by a backup "target" database in order to initiate recovery of lost transactions that had not been fully backed up at the time of a catastrophic data-loss event, in accordance with embodiments of the present invention.

FIG. 9 is a flow chart that shows steps performed by a backup "target" database in order to initiate recovery of lost transactions that had not been fully backed up at the time of a catastrophic data-loss event. FIG. 9 contains steps 900-970, which may be performed by embodiments that incorporate the data structures of FIGS. 1-5.

In step 900, database engine 525 of a target database 5200 initiates a disaster-recovery procedure in order to facilitate the recovery of data that is no longer accessible from a source database due to the occurrence of a catastrophic data-loss event. This initiating may be performed in response to automatically detecting, through a network, a monitoring application, interactive user interface, or other automated means known in the art, that the source database is no longer accessible to users; or may be performed in response to extrinsic or manual direction from an administrator, the disaster-recovery system, a database-management system, a network-management application, or some other automated application or platform.

In step 910, database engine 525, if possible, identifies the highest-numbered or latest-in-time transaction ID ("max ID") that recovery control 523 will attempt to retrieve by means of a "priority-process" procedure in subsequent steps of FIG. 9. As explained elsewhere in this document, a priority-process procedure uses synchronous replication methods to reproduce and traverse network paths back to a source database, in order to locate and recover transactions that may not have had time to reach their target backup system at the time of a catastrophic system failure. Here, the max ID identifies the most recently completed database transaction that could not be completely backed up (that is, successfully stored in the target backup database's persistent storage 529) before a catastrophic data-loss event interrupted the backup procedure.

The max ID may be determined by any means known in the art, such as by receiving an identification from a source database from which the transaction identified by the max ID originated, by receiving an identification from a network-management platform or database-logging application, or by means of manual identification by an administrator. In some embodiments, if it is not possible for database engine 525 to identify the max ID, a max ID value may be determined empirically by further steps of FIG. 9.

In step 920, database engine 525 queries recovery control 523 for an identification of the highest-numbered transaction ID of a transaction that had been successfully backed up and stored in the target database's persistent storage 529. This transaction ID will be the lower boundary (or "min ID") of a range of transactions that recovery control 523 will attempt to retrieve by means of a priority-process procedure in subsequent steps of FIG. 9. In other words, the min ID identifies the last database transaction that was successfully backed up and the max ID identifies the last database transaction that was completed, but did not have time to be backed up. Subsequent steps of the method of FIG. 9 will use a priority process in an attempt to locate and recover lost transactions that fall within this range before the system's full-blown, site-wide data-recovery operation begins.

The max ID and the min ID initially identify upper and lower boundaries of a range of transactions that the disaster-recovery system will try to retrieve by means of the priority process before attempting to recovery data stored in the target database 5200. This range of transactions comprises transactions that had been executed on the original source database, but may not yet have been fully replicated to the backup target database.

In step 930, recovery control 523 retrieves from target system 5200's topology manager 501 an identification of a predecessor system that is the direct predecessor of the target system 5200 along a network path between the target database and a source database that is the original source of the transaction identified by the max ID.

In the example of FIG. 9, this predecessor is an SATC 5000, similar to SATC 5000 of FIG. 5, that is a direct predecessor of target database 5200. Topology manager 521 is able to identify this direct predecessor because, like the SATC's topology manager 501, topology manager 521 stores and maintains a representation of the topology of the disaster-recovery network. This representation includes connectivity data sufficient to identify or derive network paths from target database 5200 to either the source database or to a recovery database to which source-database transactions previously backed-up to the target database's persistent storage 529 will be restored.

In step 940, recovery control module 523 directs predecessor system 5000 to initiate a priority-process procedure for the range of transactions bounded by the min ID and the max ID. If no max ID has been specified, recovery control module 523 directs predecessor system 5000 to initiate a priority-process procedure for all transactions with transaction IDs greater than the min ID. These are transactions that were completed by the source database but had not had time to be successfully replicated to the target database.

The intent of this priority process is to ensure that the target database 5200 has received and stored all transactions that had not yet been fully replicated to the target backup database at the time of the source-database's data loss. This helps ensure that the target database has been fully updated with all transactions that were in transit at the time of the catastrophic event.

As explained in earlier figures, when a priority-process replication is requested by an SATC 5000, the request is propagated through all predecessor systems of the SATC 5000 along a reverse network path back to an original source database. The requesting SATC 5000 then waits for each predecessor along that path to report whether the requested transaction has been stored in that predecessor's local persistent storage and then successfully replicated to that predecessor's direct successor. The priority process concludes upon confirmation that the requested transaction has been replicated through the entire path, thus reaching the target database's persistent storage.

In step 950, SATC 5000, upon receiving the results of the priority process, resets the value of the max ID to the highest-numbered transaction ID of any transaction received by means of the priority process. This means that the range of transactions that need to be recovered is adjusted to exclude transactions that have already been recovered by the priority process.

In step 960, the target database 5200 delays its recovery procedure until all transactions between the min ID and the max ID reach target database 5200 and stored in the target database 5200's persistent storage 529.

In step 970, once all transactions have been stored in the target system 5200's persistent storage 529, thus ensuring that the target database has been fully updated, the target database engine 525 begins its full-blown data-recovery operation, which will restore the source-database backup, stored in the target database's storage 529, to a recovery database that will be accessible to users.

In one example of this procedure, target database engine 525 had initially identified the transaction identified by transaction ID #2450 as being the highest-known ID (at this point, both the max ID and the min ID) of a transaction written to the source database before the catastrophic data loss. This initial identification was made because transaction #2450 is the highest-numbered transaction stored in the persistent storage 529 of the target database. Before initiating a full-blown recovery procedure that would recover transactions only through transaction #2450, the target database launches a priority-process procedure that discovers that transactions #2451-2456 had also been completed by the source database before the data-loss event.

Here, the target database engine 525 had not been aware of the six higher-numbered transactions because those six transactions had not yet been replicated through the DR network all the way to the target database and stored in the target database's persistent storage 529. The priority process, however, discovered partially replicated records of those six transactions stored in the persistent storage of SATCs along the network path between the source and target databases.

In response to this discovery, the recovery control 529 determines that the highest-numbered transaction that had been performed upon the source database was transaction #2456. Recovery control 529 then resets the max ID value to #2456, the highest-numbered ID of a transaction that had been completed by the database prior to a catastrophic event. The target database 5200's database engine 525 is made aware that the target database will be an accurate backup of the source database only when all transactions through transaction #2456 have been successfully received by the target database 5200 and stored in the target database's persistent storage 529.

The target database then delays its full-blown disaster-recovery procedure until all database transactions within the min-ID/max-ID range (#2451-#2456) have had time to be replicated to the target database and stored in the target database's persistent storage area 529. Upon the receipt and storage of all transactions through #2456, database engine 525 initiates the disaster-recovery procedure in order to restore the fully updated contents of the target database to a recovery database that will be accessible to users.

Figure 10:
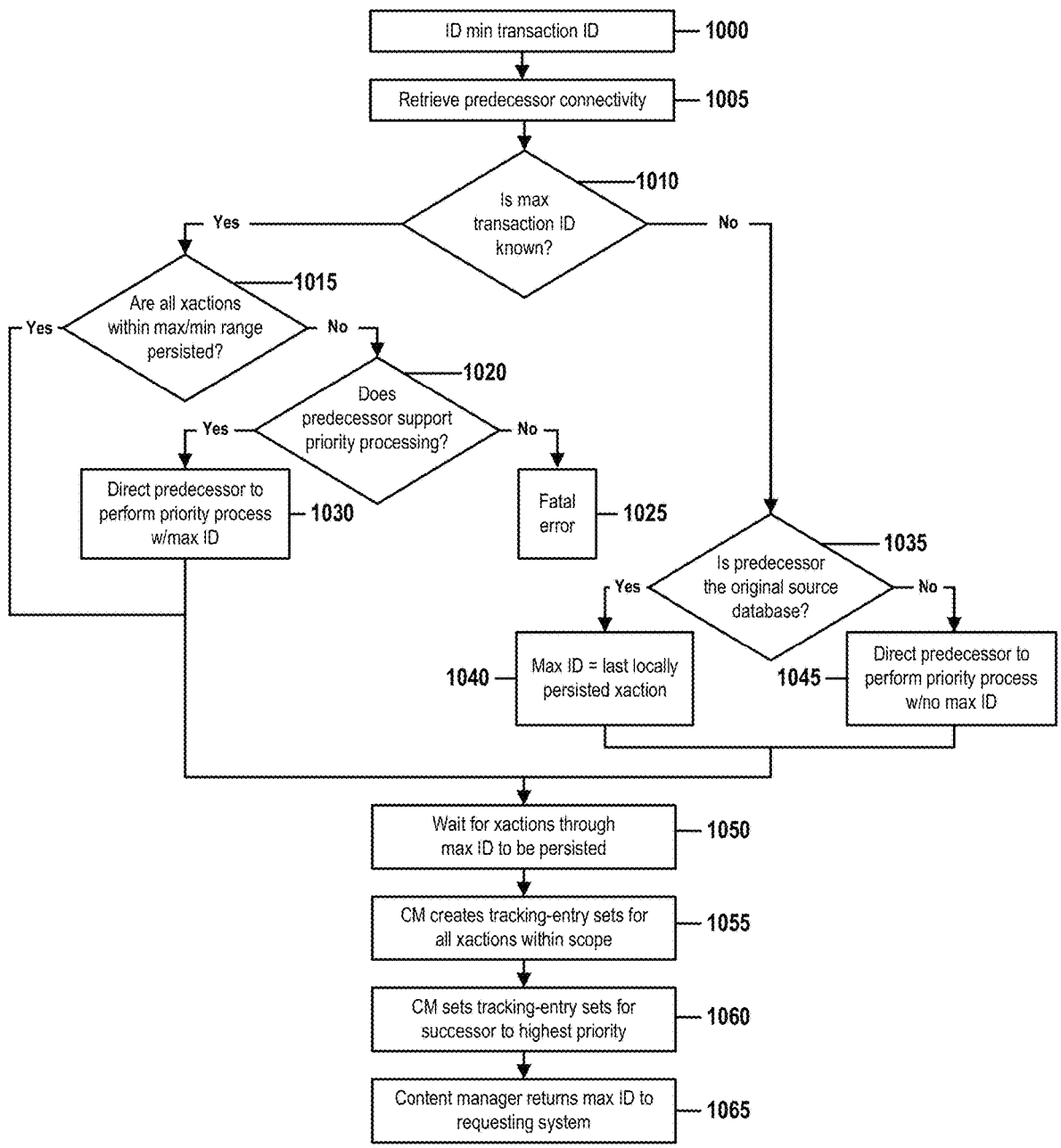
FIG. 10 is a flow chart that shows steps performed, during a priority-process procedure, by an SATC located along a path between a source database and a target database, in accordance with embodiments of the present invention.

FIG. 10 is a flow chart that shows steps performed, during a priority-process procedure, by an SATC 5000 located along a path between a source database and a target database, in accordance with embodiments of the present invention. FIG. 10 contains steps 1000-1065, which may be performed by embodiments that incorporate the data structures of FIGS. 1-5.

The method of FIG. 10 is performed by the SATC 5000 when a back-up "target" database, prior to initiating a recovery procedure for a lost "source" database, initiates a priority-process procedure in order to ensure that the target database contains a fully updated, current copy of the source database. This priority-process request is propagated through SATCs along a network path from the target database to the source database, where the priority process identifies source-database transactions that had not yet been replicated along the entire path to the target database at the time of data loss.

As shown in FIG. 5, SATC 5000 is one of the systems along the path, positioned between one or more sequentially configured predecessor systems 5100 and one or more sequentially configured successor systems 5200. During the original data-backup phase, transactions of the source database are replicated through the path from predecessors 5100 through SATC 5000 to successor 5200, and then to other downstream successor systems, to finally reach the target database. During the priority process, which is initiated (as described in FIG. 9) in order to update the target database prior to a database-recovery operation, the priority-process request is forwarded in reverse order through the path, passing from successors 5200 through SATC 5000 to predecessor 5100, and then to other predecessors leading to the original source database system.

In step 1000, the content manager module 503 of SATC 5000, in response to a priority-process request forwarded from a target database and to SATC 5000 by successor system 5200, identifies the SATC 5000's "min ID" transaction ID. This min ID identifies the most recent (highest-numbered) database transaction, received from the source database via predecessor systems 5100, that had been received and successfully stored in the local persistent storage 509 of the SATC 5000 and then successfully forwarded to successor system 5200. Any completed database transaction that has a transaction ID higher than the min ID was not successfully received and stored in the target database, and thus must be recovered by the priority-process procedure before a full-blown database recovery operation can proceed.

In step 1005, the topology manager module 501 of SATC 5000 identifies predecessor system 5100 and provides network topology and connectivity information that allows content manager 503 to locate and communicate with predecessor system 5100.

In step 1010, SATC 5000's content manager 503 determines whether a max transaction ID ("max ID") is known. The max ID is the highest-numbered transaction that had been performed by the source database prior to the source database's catastrophic failure. Before starting a disaster-recovery process, which will restore the source database from its backup in the target database, the system will need to wait until all "lost" source-database transactions, greater than the min ID and no greater than the max ID, have had sufficient time to reach the target database.

As described in FIG. 9, the max ID may have been identified through various means known in the art. In some embodiments, for example, the max ID may be supplied by successor system 5200 when successor system 5200 forwards the priority-process request (initially generated by the target system) to SATC 5000. In other cases, the SATCs will continuously update the max ID value each time they locate another transaction that is still replicating through the network.

If the max ID is not known, the max ID may in some cases be determined empirically when the priority process is ultimately propagated to the SATC that is the first successor of the source database. The highest-numbered transaction to have been replicated to that first source-database successor will then be identified as having the highest-numbered transaction ID that can possibly be recovered, and this highest-numbered transaction will then be propagated along the network path, ultimately to the target database, as the true max ID value.

If the content manager 503 determines in step 1010 that the max transaction ID is already known, the method of FIG. 10 continues with steps 1015-1030 before concluding with steps 1050-1065. If the final value of the max transaction ID is not yet known, the SATC 5000 instead performs steps 1035-1050 before the method of FIG. 10 concludes with steps 1050-1065.

In step 1015, having determined that a value of the max ID is known, content manager 503 determines whether all transactions associated with transaction IDs within the min ID/max ID range have been successfully processed by SATC 5000 and stored in SATC 5000's local persistent storage 509. If so, the method of FIG. 10 concludes with steps 1050-1065. If not, the method of FIG. 10 performs steps 1020-1030 before concluding with steps 1050-1065.

In step 1020, having determined that a max ID is known (that is, that a range of incompletely replicated "to be processed" transactions is defined) and that SATC 5000 has not yet processed all the transactions in the range, content manager 503 determines whether the predecessor system 5100 is capable of implementing a priority process. If not, SATC 5000 determines that at least one component of the disaster-recovery system network is not comprised by an embodiment of the present invention and the method of FIG. 10 ends with a fatal error in step 1025.

If, however, content manager 503 determines that predecessor 5100 is capable of implementing a priority process, the method of FIG. 10 continues with steps 1030 and 1050-1065.

In step 1030, SATC 5000 directs predecessor 5100 to initiate a priority process to recover transactions identified by IDs within the range of the previously identified min ID and max ID values. If predecessor system 5100 is an SATC, predecessor 5100 then pseudo-recursively performs the method of FIG. 10.

In step 1035, the content manager 503, having determined in step 1010 that the max transaction ID is not known, determines whether predecessor system 5100 is the original source database or is another SATC along the network path between the source database and the target database. If the predecessor is the source database, the method of FIG. 10 continues with step 1040 before concluding with steps 1050-1065. If other SATCs are located on the path between the source database and predecessor 5100, the method of FIG. 10 continues with step 1045 before concluding with steps 1050-1065.

In step 1040, having determined that predecessor 5100 is the original source database, content manager 503 identifies the true max ID value as being the highest-numbered transaction ID of a transaction that was successfully stored in the source database's persistent storage 515. If the source database is unavailable, due to problems related with the catastrophic event, then content manager 503 identifies the true max ID value as being the highest-numbered transaction ID of a transaction that was successfully stored in the predecessor's database's persistent storage 515.

In step 1045, having determined that predecessor 5100 is not the original source database, content manager 503 directs predecessor SATC 5100 to perform the previously requested priority process without a max ID. SATC 5000 assumes in this step that predecessor 5100 will continue to propagate the priority-process request backwards through the network path until the request finally reaches the source database (or the SATC that is the direct successor to the source database, should the source database be unreachable). The true max ID is then set to the highest-numbered transaction ID of a transaction stored in the source database's persistent storage 515 (or in the persistent storage 515 of the direct successor to the source database). That true max ID value will then be returned to SATC 5000, and will be propagated through each SATC along the network path back to the target database.

In step 1050, SATC 5000 waits until any outstanding unprocessed transactions within the range from min ID through max ID are received by SATC 5000 and stored in SATC 5000's persistent storage 509. Once this task has completed, all transactions within the desired range will have been replicated along the path from the source ID to the target ID, as far as the SATC 5000.

In step 1055, content manager 503 of SATC 5000 creates a set of tracking entries for each transaction within the min ID/max ID range received by SATC 5000 in step 1050. Each tracking-entry set identifies all successor SATCs along the remainder of path to the target system.

In step 1060, content manager 503 optionally sets a QoS priority parameter for each tracking-entry set generated to 1055. This priority parameter will assign each tracking entry the highest priority on the successor system 5200 to which the associated transaction will be replicated. Each tracking-entry set will ultimately be forwarded, along with the set's associated priority parameter, to the next successor system identified by that tracking-entry set, and this process will continue until all transactions within the min ID/max ID range have been successfully replicated to and stored on the target database.

In step 1065, content manager 503 forwards the true max ID through the remainder of the successor network path back to the SATC or to the target database that originally initiated the priority process. This step may be accomplished by sending the true max ID to the successor system from which SATC 5000 received the priority-process request prior to step 1000.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A disaster-recovery system comprising a processor, a memory coupled to the processor, and a computer-readable hardware persistent-storage device coupled to the processor, the persistent-storage device containing program code configured to be run by the processor via the memory to implement a method for site-consolidated disaster-recovery with synchronous-to-asynchronous traffic conversion, the method comprising:

the processor receiving notice that a source database has become inaccessible,
where transactions of the source database are backed up, via synchronous replication to a target database, through a backup path comprised by a disaster-recovery network,
where each non-database node of the disaster-recovery network hosts a unique SATC (Synchronous-to-Asynchronous Converter) of a plurality of SATC modules, and
where a synchronous replication of a transaction from a predecessor SATC on the backup path to an adjacent successor SATC on the backup path comprises storing local copies of the transaction in local persistent storage areas of the predecessor SATC and the successor SATC;
the processor identifying a range of partially replicated transactions of the source database that have not been replicated to the target database;
the processor pausing any ongoing data-restoration operations;
the processor generating one or more sets of tracking entries,
where each set of the one or more sets associates one transaction of the partially replicated transactions with a recovery path, through the disaster-recovery network, from the target database to the source database;
the processor locating previously stored copies of one or more of the partially replicated transactions in local storage areas of SATCs on the recovery path;
the processor waiting until the located transaction copies have been replicated to the target database; and
the processor restarting any paused data-restoration operations.

2. The disaster-recovery system of claim 1, where the recovery path consists of the backup path in reverse order.

3. The disaster-recovery system of claim 1, where the identifying the range of partially replicated transactions comprises:
the processor setting a lower boundary of the range as a function of a most recent source-database transaction known to have been successfully replicated to the target database; and
the processor initially setting the upper boundary of the range to identify the greater of:
i) a most recent transaction known to have been completed by the source database before the source database became inaccessible, and
ii) a transaction that would immediately succeed a transaction identified by the lower boundary.

4. The disaster-recovery system of claim 1, where the generating the one or more sets of tracking entries is performed as a function of information, accessible by the processor, describing a topology of the disaster-recovery network.

5. The disaster-recovery system of claim 1, where each tracking entry of a first set of the one or more sets of tracking entries identifies:
a lost transaction, of the range of partially replicated transactions, that is associated with the first set,
one SATC, on the recovery path, through which the lost transaction must be replicated in order for the lost transaction to reach the source database, and
a network node of the disaster-recovery network that hosts the one SATC.

6. The disaster-recovery system of claim 1, where the locating the partially replicated transactions further comprises:
the processor selecting a next candidate transaction from transactions remaining in the range of partially replicated transactions;
the processor accessing a next set of the one or more sets of tracking entries, where the next set identifies a next recovery path of the next candidate transaction;
the processor determining whether a copy of the next candidate transaction is stored in a local storage area of a first SATC, where the first SATC is adjacent, along the next recovery path, to the target database;
the processor, if determining that a copy of the next candidate transaction is not stored in the local storage area of the first SATC:
referring to a tracking entry of the next set to identify a next SATC along the next recovery path, where the next SATC is adjacent to the first SATC;
instructing the first SATC to direct the next SATC to determine whether a copy of the next candidate transaction is stored in a local storage area of the next SATC; and
propagating the determining, the referring to, and the instructing, through each SATC along the next recovery path until either:
i) a copy of the next candidate transaction is located in a local storage area of an SATC on the next recovery path; or
ii) every node of the next recovery path has been traversed without locating a copy of the next candidate transaction;
the processor ensuring that any located copy of the next candidate transaction will be replicated through the backup path to the target database;
the processor deleting the next candidate transaction from the range of partially replicated transactions; and
the processor repeating the selecting, the accessing, the determining, the referring to, the instructing, the propagating, the ensuring, and the deleting for each remaining transaction of the set of partially replicated transactions.

7. The disaster-recovery system of claim 6, where the identifying the range of partially replicated transactions further comprises:
the processor revising the upper boundary of the range such that:
the range consists of all transactions known to be located in a local storage area of an SATC on a recovery path identified by any set of the one or more sets of tracking entries, but not yet replicated to the target database, and
a most-recently performed transaction of the range will be selected next as a next candidate transaction.

8. A method for site-consolidated disaster-recovery with synchronous-to-asynchronous traffic conversion, the method comprising:
a processor of a disaster-recovery system receiving notice that a source database has become inaccessible, where transactions of the source database are backed up, via synchronous replication to a target database, through a backup path comprised by a disaster-recovery network, where each non-database node of the disaster-recovery network hosts a unique SATC (Synchronous-to-Asynchronous Converter) of a plurality of SATC modules, and where a synchronous replication of a transaction from a predecessor SATC on the backup path to an adjacent successor SATC on the backup path comprises storing local copies of the transaction in local persistent storage areas of the predecessor SATC and the successor SATC;

the processor identifying a range of partially replicated transactions of the source database that have not been replicated to the target database;

the processor pausing any ongoing data-restoration operations;

the processor generating one or more sets of tracking entries, where each set of the one or more sets associates one transaction of the partially replicated transactions with a recovery path, through the disaster-recovery network, from the target database to the source database;

the processor locating previously stored copies of one or more of the partially replicated transactions in local storage areas of SATCs on the recovery path;

the processor waiting until the located transaction copies have been replicated to the target database; and the processor restarting any paused data-restoration operations.

9. The method of claim 8, where the recovery path consists of the backup path in reverse order.

10. The method of claim 8, where the identifying the range of partially replicated transactions comprises:

the processor setting a lower boundary of the range as a function of a most recent source-database transaction known to have been successfully replicated to the target database; and the processor initially setting the upper boundary of the range to identify the greater of:
  i) a most recent transaction known to have been completed by the source database before the source database became inaccessible, and
  ii) a transaction that would immediately succeed a transaction identified by the lower boundary.

11. The method of claim 8, where the generating the one or more sets of tracking entries is performed as a function of information, accessible by the processor, describing a topology of the disaster-recovery network.

12. The method of claim 8, where each tracking entry of a first set of the one or more sets of tracking entries identifies:

a lost transaction, of the range of partially replicated transactions, that is associated with the first set, one SATC, on the recovery path, through which the lost transaction must be replicated in order for the lost transaction to reach the source database, and a network node of the disaster-recovery network that hosts the one SATC.

13. The method of claim 8, where the locating the partially replicated transactions further comprises:

the processor selecting a next candidate transaction from transactions remaining in the range of partially replicated transactions;

the processor accessing a next set of the one or more sets of tracking entries, where the next set identifies a next recovery path of the next candidate transaction;

the processor determining whether a copy of the next candidate transaction is stored in a local storage area of a first SATC, where the first SATC is adjacent, along the next recovery path, to the target database;

the processor, if determining that a copy of the next candidate transaction is not stored in the local storage area of the first SATC:

referring to a tracking entry of the next set to identify a next SATC along the next recovery path, where the next SATC is adjacent to the first SATC;

instructing the first SATC to direct the next SATC to determine whether a copy of the next candidate transaction is stored in a local storage area of the next SATC; and propagating the determining, the referring to, and the instructing, through each SATC along the next recovery path until either:
  i) a copy of the next candidate transaction is located in a local storage area of an SATC on the next recovery path; or
  ii) every node of the next recovery path has been traversed without locating a copy of the next candidate transaction;

the processor ensuring that any located copy of the next candidate transaction will be replicated through the backup path to the target database;

the processor deleting the next candidate transaction from the range of partially replicated transactions; and the processor repeating the selecting, the accessing, the determining, the referring to, the instructing, the propagating, the ensuring, and the deleting for each remaining transaction of the set of partially replicated transactions.

14. The method of claim 8, further comprising providing at least one support service for at least one of creating, integrating, hosting, maintaining, and deploying computer-readable program code in the computer system, wherein the computer-readable program code in combination with the computer system is configured to implement the receiving, the identifying, the pausing, the generating, the locating, the waiting, and the restarting.

15. A computer program product, comprising a computer-readable hardware storage device having a computer-readable program code stored therein, the program code configured to be executed by a disaster-recovery comprising a processor, a memory coupled to the processor, and a computer-readable hardware storage device coupled to the processor, the storage device containing program code configured to be run by the processor via the memory to implement a method for site-consolidated disaster-recovery with synchronous-to-asynchronous traffic conversion, the method comprising:

the processor receiving notice that a source database has become inaccessible, where transactions of the source database are backed up, via synchronous replication to a target database, through a backup path comprised by a disaster-recovery network, where each non-database node of the disaster-recovery network hosts a unique SATC (Synchronous-to-Asynchronous Converter) of a plurality of SATC modules, and where a synchronous replication of a transaction from a predecessor SATC on the backup path to an adjacent successor SATC on the backup path comprises storing local copies of the transaction in local persistent storage areas of the predecessor SATC and the successor SATC;

the processor identifying a range of partially replicated transactions of the source database that have not been replicated to the target database;

the processor pausing any ongoing data-restoration operations;

the processor generating one or more sets of tracking entries,
where each set of the one or more sets associates one transaction of the partially replicated transactions with a recovery path, through the disaster-recovery network, from the target database to the source database;

the processor locating previously stored copies of one or more of the partially replicated transactions in local storage areas of SATCs on the recovery path;

the processor waiting until the located transaction copies have been replicated to the target database; and the processor restarting any paused data-restoration operations.

16. The computer program product of claim 15, where the recovery path consists of the backup path in reverse order.

17. The computer program product of claim 15, where the identifying the range of partially replicated transactions comprises:
the processor setting a lower boundary of the range as a function of a most recent source-database transaction known to have been successfully replicated to the target database; and
the processor initially setting the upper boundary of the range to identify the greater of:
i) a most recent transaction known to have been completed by the source database before the source database became inaccessible, and
ii) a transaction that would immediately succeed a transaction identified by the lower boundary.

18. The computer program product of claim 15, where the generating the one or more sets of tracking entries is performed as a function of information, accessible by the processor, describing a topology of the disaster-recovery network.

19. The computer program product of claim 15, where each tracking entry of a first set of the one or more sets of tracking entries identifies:
a lost transaction, of the range of partially replicated transactions, that is associated with the first set,
one SATC, on the recovery path, through which the lost transaction must be replicated in order for the lost transaction to reach the source database, and
a network node of the disaster-recovery network that hosts the one SATC.

20. The computer program product of claim 15, where the locating the partially replicated transactions further comprises:
the processor selecting a next candidate transaction from transactions remaining in the range of partially replicated transactions;
the processor accessing a next set of the one or more sets of tracking entries, where the next set identifies a next recovery path of the next candidate transaction;
the processor determining whether a copy of the next candidate transaction is stored in a local storage area of a first SATC, where the first SATC is adjacent, along the next recovery path, to the target database;
the processor, if determining that a copy of the next candidate transaction is not stored in the local storage area of the first SATC:
referring to a tracking entry of the next set to identify a next SATC along the next recovery path, where the next SATC is adjacent to the first SATC;
instructing the first SATC to direct the next SATC to determine whether a copy of the next candidate transaction is stored in a local storage area of the next SATC; and
propagating the determining, the referring to, and the instructing, through each SATC along the next recovery path until either:
i) a copy of the next candidate transaction is located in a local storage area of an SATC on the next recovery path; or
ii) every node of the next recovery path has been traversed without locating a copy of the next candidate transaction;
the processor ensuring that any located copy of the next candidate transaction will be replicated through the backup path to the target database;
the processor deleting the next candidate transaction from the range of partially replicated transactions; and
the processor repeating the selecting, the accessing, the determining, the referring to, the instructing, the propagating, the ensuring, and the deleting for each remaining transaction of the set of partially replicated transactions.

\* \* \* \* \*